United States Patent [19]

Pfeiffer et al.

[11] Patent Number: 4,687,037
[45] Date of Patent: Aug. 18, 1987

[54] PNEUMATIC VEHICLE TIRE

[75] Inventors: Hans-Dieter Pfeiffer; Heinrich Huinink, both of Garbsen; Thorsten Reese, Neustadt, all of Fed. Rep. of Germany

[73] Assignee: Continental Gummi-Werke Aktiengesellschaft, Hanover, Fed. Rep. of Germany

[21] Appl. No.: 770,413

[22] Filed: Aug. 28, 1985

[30] Foreign Application Priority Data

Aug. 29, 1984 [DE] Fed. Rep. of Germany ....... 3431655

[51] Int. Cl.4 ............................................. B60C 11/04
[52] U.S. Cl. ........................... 152/209 R; 152/209 D; 152/538
[58] Field of Search ............... 152/209 R, 209 D, 538, 152/209 WT, 209 NT

[56] References Cited

U.S. PATENT DOCUMENTS

| 54,114 | 3/1919 | Midgley | 152/209 D |
|---|---|---|---|
| D. 185,554 | 6/1959 | Lane | 152/209 D |
| 1,956,011 | 4/1934 | Evans | 152/14 |
| 3,001,568 | 9/1961 | Suominen | 152/209 R |
| 3,254,693 | 6/1966 | Travers | 152/538 X |
| 3,677,319 | 7/1972 | Mirtain | 152/538 X |
| 3,682,220 | 8/1972 | Verdier | 152/209 D |
| 3,717,190 | 2/1973 | Boileau | 152/538 X |
| 4,244,415 | 1/1981 | Peter et al. | 152/209 R X |
| 4,278,121 | 7/1981 | McDonald | 152/209 R |
| 4,345,632 | 8/1982 | Takigawa et al. | 152/209 R |
| 4,351,381 | 9/1982 | Roberts et al. | 152/209 R |
| 4,416,316 | 11/1983 | Clatworthy et al. | 152/209 R |

FOREIGN PATENT DOCUMENTS 58-04605  1/1983  Japan ............... 152/209 D

Primary Examiner—Donald E. Czaja
Assistant Examiner—Ramon R. Hoch
Attorney, Agent, or Firm—Becker & Becker, Inc.

[57] ABSTRACT

A pneumatic vehicle tire which is provided with a belt and with tread rib sections which are separated from one another by respective circumferential grooves. One or more cord fabric plies are disposed in the vicinity of the circumferential grooves to reinforce the belt. The cord fabric plies essentially extend over the width of the groove, and preferably have a width which is slightly greater than the width of the grooves.

3 Claims, 2 Drawing Figures

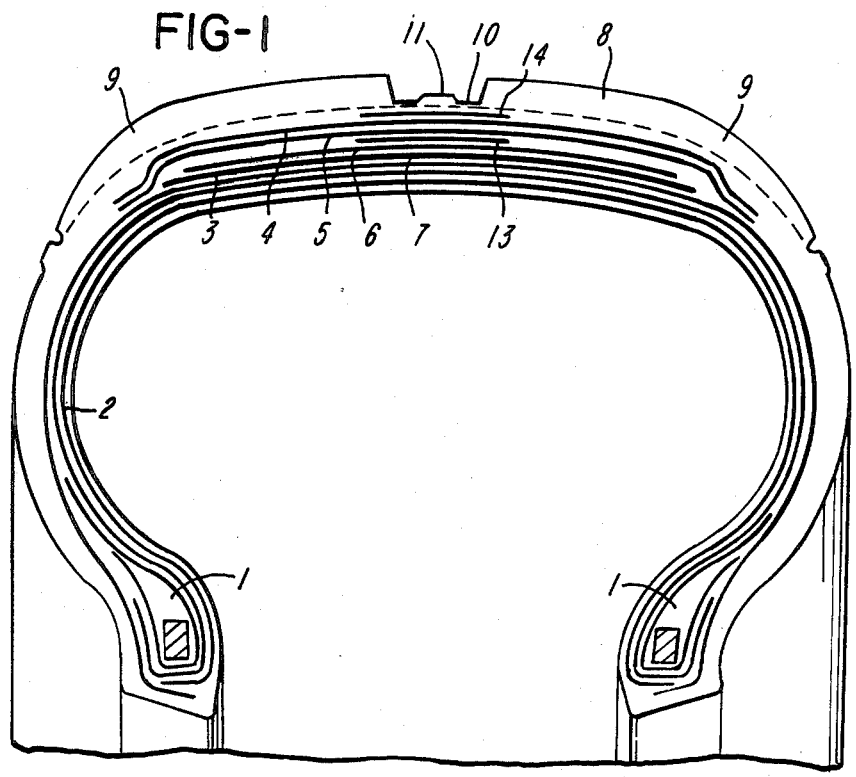
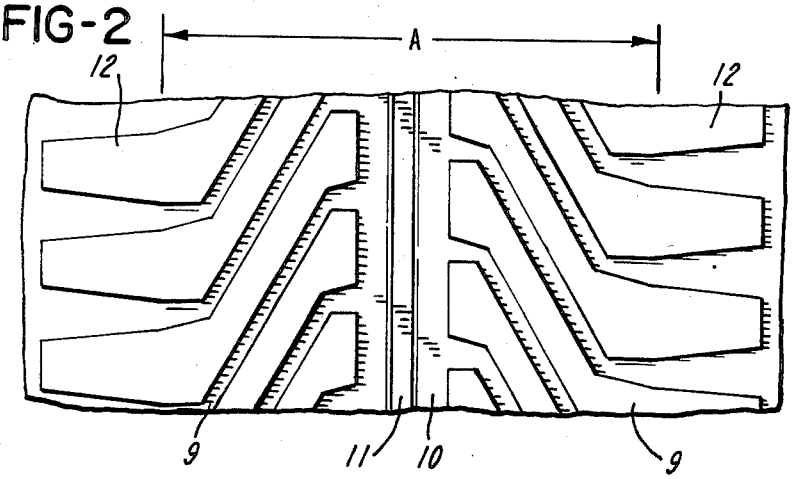

PNEUMATIC VEHICLE TIRE

BACKGROUND OF THE INVENTION

1. Field of the Invention

The present invention relates to a pneumatic vehicle tire which is provided with a belt and with tread rib sections which are separated from one another by respective circumferential grooves.

2. Description of the Prior Art

Such tread rib sections, which are separated from one another by circumferential grooves, act, so to speak, as independent profiled tread regions. For this reason, the profiling is particularly suitable for diverting water found on the roadway, in order in this way to preclude the so-called hydroplaning effect.

An object of the present invention is to provide tread rib sections having flexibility and deformability which is similar to that of a single tread rib section of conventional pneumatic vehicle tires. Furthermore, the present invention is intended to prevent undesired deformation of the tire carcass due to the relatively wide circumferential grooves.

BRIEF DESCRIPTION OF THE DRAWINGS

These objects, and other objects and advantages of the present invention, will appear more clearly from the following specification in conjunction with the accompanying drawings, in which:

FIG. 1 is a partial radial section through one inventive embodiment of a pneumatic vehicle tire; and FIG. 2 is a partial plan view of the tire of FIG. 1.

SUMMARY OF THE INVENTION

The pneumatic vehicle tire of the present invention is characterized primarily in that one or more cord fabric plies are provided in the vicinity of the circumferential groove in order to reinforce the belt; the width of these cord fabric plies essentially corresponds to the width of the circumferential grooves, yet is preferably slightly greater than the width of the associated groove.

The cord fabric plies can have widths which are approximately 50 to 70% greater than the width of the circumferential grooves. In this way, it is also possible to increase even further the independence of the individual tread rib sections. Thus, the circumferential grooves can be even wider, so that, when a single circumferential groove is provided in the middle of the tread, this groove has a width of 20 to 25% of the support surface of the tread profile.

Further details of the present invention will be described subsequently.

DESCRIPTION OF PREFERRED EMBODIMENTS

Referring now to the drawings in detail, a pull-resistant, transversely-stiff belt 3 is disposed between the tread strip zone of the tire and its radial carcass 2, which is anchored in the beads 1. The belt 3 comprises a plurality of plies 4, 5, 6, and 7, which essentially extend over the width of the tread strip; the load-carrying cords of the plies 4-7 form a cross-banding arrangement with one another in the customary manner. This so-called 4-ply belt comprises load-carrying cords which are customary in tire construction, and which can thus be selected in conformity with existing requirements.

The tread strip 8 of the illustrated exemplary pneumatic tire is in two parts. It is formed by two tread rib sections 9 which are separated from one another in the middle of the tire by a circumferential groove 10 which has a rib-like raised portion 11 on the base of the groove 10. While forming a so-called V-profile, the tread rib sections 9 have inclined ribs 12 which extend parallel to one another and at an angle of about 30° to the circumferential direction of the tire.

The width of the circumferential groove 10 is about 20% of the width A of the support surface of the tread strip 8.

In order to make the tread rib sections 9, which are formed by the circumferential groove 10, as independent as possible, and hence to preclude more severe deformations of the carcass 2, the present invention provides for the disposition of a cord fabric ply 13 between the upper, i.e. more radially outwardly disposed, plies 5, 6. A further cord fabric ply 14 is disposed between the base of the circumferential groove 10 and the upper, i.e. radially outer, ply 4. Both of the cord fabric plies 13, 14 comprise parallel, rubberized filaments, cords, or the like which form an acute angle with the circumferential direction of a tire, thus resulting in pull-resistant cord fabric plies.

The present invention is, of course, in no way restricted to the specific disclosure of the specification and drawings, but also encompasses any modifications within the scope of the appended claims.

What we claim is:

1. A pneumatic vehicle tire which is provided with a belt and with tread rib sections which are separated from one another by a circumferential groove; said tire in combination comprising:
   at least one cord fabric ply disposed in the vicinity of said circumferential groove to reinforce said belt; each of said cord fabric plies essentially extending over the width of a given one of said circumferential groove;
   said cord fabric plies having a width slightly greater than the width of said circumferential groove;
   said tire including only a single circumferential groove extending continuously and located across the support surface of the treat profile, and two tread rib sections which have a given support surface, with the width of said circumferential groove being 20-25% of the width of said support surface; and in which the width of said cord fabric plies is approximately 50 to 70% greater than the width of said circumferential groove;
   said circumferential groove having a base on which is provided a circumferential raised portion disposed with an upper surface thereof below the support surface of the tread profile;
   said tire including said two tread rib sections, each of which comprises ribs which extend parallel to one another and at an angle to the circumferential direction of said tire; viewed as a whole, said ribs of said treat rib sections being symmetrically disposed in the shape of a V.

2. A tire in combination according to claim 1, in which said belt has several plies, and in which said cord fabric plies are disposed in the radially outer region of said belt plies.

3. A tire in combination according to claim 2, in which one of said cord fabric plies is disposed radially outwardly of said belt plies between said belt and said circumferential groove.

* * * * *